United States Patent
Ploetz et al.

(10) Patent No.: US 7,384,360 B2
(45) Date of Patent: Jun. 10, 2008

(54) THRUST WASHER FOR A PLANETARY GEARBOX

(75) Inventors: Volker Ploetz, Herzogenaurach (DE); Wolfgang Fugel, Nürnberg (DE); Alexander Reimchen, Herzogenaurach (DE); Horst Engelhardt, Gerhardshofen (DE)

(73) Assignee: Schaeffler KG, Herzogenaurach (DE)

( * ) Notice: Subject to any disclaimer, the term of this patent is extended or adjusted under 35 U.S.C. 154(b) by 199 days.

(21) Appl. No.: 10/563,999

(22) PCT Filed: Jun. 23, 2004

(86) PCT No.: PCT/EP2004/006755

§ 371 (c)(1),
(2), (4) Date: Jan. 9, 2006

(87) PCT Pub. No.: WO2005/022005

PCT Pub. Date: Mar. 10, 2005

(65) Prior Publication Data

US 2006/0205558 A1    Sep. 14, 2006

(30) Foreign Application Priority Data

Jul. 29, 2003    (DE)    ................. 103 34 880

(51) Int. Cl.
*F16H 57/04*    (2006.01)

(52) U.S. Cl. ..................... 475/159; 475/331
(58) Field of Classification Search ............... 475/331, 475/159, 348; 384/121, 107, 112, 123
See application file for complete search history.

(56) References Cited

U.S. PATENT DOCUMENTS

| | | | |
|---|---|---|---|
| 3,316,035 A | 4/1967 | Zuber | |
| 5,064,298 A | 11/1991 | Hibi et al. | |
| 5,795,258 A * | 8/1998 | Faass et al. | 475/348 |
| 5,928,100 A | 7/1999 | Ohtake et al. | |
| 6,135,910 A | 10/2000 | Urmaza et al. | |
| 6,443,846 B1 * | 9/2002 | Dziedzic et al. | 464/41 |
| 6,511,226 B2 * | 1/2003 | Thompson et al. | 384/420 |
| 7,189,183 B2 * | 3/2007 | Fugel et al. | 475/331 |

FOREIGN PATENT DOCUMENTS

| | | |
|---|---|---|
| DE | 35 02 076 | 1/1985 |
| DE | 40 09 968 | 11/1990 |
| DE | 40 29 373 | 3/1992 |
| DE | 44 18 693 | 3/1995 |
| DE | 196 08 551 | 9/1997 |

(Continued)

OTHER PUBLICATIONS

Precision Steel Warehouse, INC. technical data, 1996-2003.*

(Continued)

*Primary Examiner*—Tisha D Lewis
(74) *Attorney, Agent, or Firm*—Volpe and Koenig, P.C.

(57) ABSTRACT

A thrust washer (9) for planet gears (6) of a planetary gearbox is provided that is made form a tempered, cold rolled strip having a flatness less than or equal to 0.03 mm, and a hardness ranging from 370 to 580 HV. The thrust washer (9) can be produced in a particularly cost effective manner by making it from an appropriate initial stock having the desired final properties.

5 Claims, 4 Drawing Sheets

FOREIGN PATENT DOCUMENTS

| | | |
|---|---|---|
| DE | 198 04 734 | 8/1998 |
| DE | 199 02 565 | 7/2000 |
| GB | 706128 | 3/1954 |
| GB | 1 015 278 | 12/1965 |
| GB | 1 433 890 | 4/1976 |
| GB | 2 034 827 | 6/1980 |

OTHER PUBLICATIONS

Brown Metals Company, technical information, 1997-2007.*
Eberle, Precision Strip Steel, technical information, Sep. 2004.*
Din En 10132-4: Kaltband aus Stahl für eine Wärmebehandlung, Teil 4, Apr. 2003, Tab. 3.
Din En 10140: Kaltband, Grenzabmaße und Formtoleranzen, Oct. 1996; Tab. 1,5.

* cited by examiner

THRUST WASHER FOR A PLANETARY GEARBOX

BACKGROUND

The invention relates to a thrust washer for planet gears of a planetary gearbox. The thrust washers are arranged with their positioning bore hole on the planet gear pins that are fixed in a planet carrier and contact both sides of the planet gears, which are supported rotatably by a rolling bearing on the planet gear pin. For lubricant supply, the planet gear pin is provided with an axial lubricant through hole and a radial lubricant through hole branching off from the axial hole and the thrust washer is provided with axial through holes.

Thrust washers of this type are already known in a wide variety of embodiments. They are used for the axial stop of the planet gear and for protecting the non-hardened planet carrier and also the planet gear from wear. Here, with a flat end surface, the planet gear contacts a similarly flat stopping surface of the thrust washer. The planet gear is provided with a continuous bore hole, with which it is held rotatably on the planet gear pin with the help of a bearing. This bearing can be formed, for example, by a needle collar or also by a cageless needle set. Therefore, according to the type of bearing, either the bearing cage or the ends of the bearing needles contact the thrust washers. The thrust washers are usually stamped from sheet metal. The surface of the thrust washers is either ground or coated. The selection of the material for the washers and their surface quality, as well as their surface hardness, is essentially dependent on the known friction relationships.

However, very often the lubricating relationships at the contact points between the thrust washers and the end surfaces of the planet gears are unsatisfactory. In this case, bronze washers are also used as thrust washers. Now and then, two thrust washers made from different materials, one next to the other, are also used or multiple-layer thrust washers, for example, plated metal plates, are used. Here, the materials steel and bronze are combined with one another. This arrangement takes into account the different stopping and friction relationships between the planet gear and the thrust washer on one hand and the thrust washer and the planet carrier on the other hand.

Also, through a corresponding configuration of the thrust washers, the lubricant circulation within the planetary gearbox and especially at the bearing of the planet gear is influenced in a positive way. The lubricant circulation in the bearing of the planet gear and the lubrication of the stopping surfaces of the thrust washers in the contact area with the planet gear is achieved through oil grooves formed in a targeted way in the surface of the thrust washers or through axial through holes.

Such a thrust washer is previously known, for example, from DE 35 02 076 C1. This thrust washer has two ends formed as flat stopping surfaces and is provided with an angular opening, through which lubricant is to be fed to the bearing. Another thrust bearing is previously known from DE 198 04 734 A1. It is embodied as a flat steel ring, whose ends are provided with impressions and whose positioning bore hole is provided with through holes. Such thrust washers are also previously described in DE 44 18 693 C1. Finally, in DE 40 09 968 A1, a composite thrust washer is presented, which comprises a steel and a copper washer. The inner steel thrust washer exhibits a hardness of 700 to 1500 HV (diamond penetrator hardness number), while the outer copper thrust washer should have a hardness of 200 to 350 HV.

For these thrust washers, it is disadvantageous that for axial contact of the planet gear on the thrust washer, under unfavorable conditions, the lubricant film at the contact points can break down or be interrupted. The result is inadequate lubrication and premature wear at the contact points, which in the extreme case can lead to loss of the entire planetary gearbox. It is further disadvantageous that such thrust washers are relatively complicated and consequently are also expensive to manufacture.

SUMMARY

Therefore, the objective of the invention is to provide a thrust washer for a planetary gearbox, with whose use the lubricant film at the contact points between the end of the planet gear and the stopping surface of the thrust washer is not broken or cut off. In addition, the thrust washer should be able to be manufactured economically using simple means and methods.

According to the invention, this objective is met according to the characterizing portion of claim 1 in connection with its preamble, such that the thrust washer is made from a tempered cold-rolled strip with a flatness of $\leq 0.03$ mm and exhibits a hardness from 370 to 580 HV.

The decisive advantage of the thrust washers according to the invention lies in the fact that these can be produced in a simple way through stamping from the tempered cold-rolled strip. This tempered cold-rolled strip already features a hardness in the range from 370 to 580 HV and a flatness $\leq 0.03$ mm, so that costly post processing steps according to the prior state of the art are unnecessary. Subsequent grinding for producing the flatness or subsequent hardening of the thrust washers is thus eliminated. The unnecessary hardening is especially important, because a hardened thrust washer is subjected to hardening deformation and also warping. With this warping, that is, with a non-existent flatness, according to the prior state of the art, grinding is necessary for producing any sort of flatness. In turn, this grinding, which generates stress marks on the flat surfaces of the thrust washer, has a negative effect on the bearing portion of the thrust washers. The necessary hardness values in the range from 370 to 580 HV satisfy all of the applications and caused absolutely no defects, as extensive tests have shown.

Additional advantageous configurations of the thrust washer are described in the subordinate claims 2 to 6.

Thus, according to claim 2, the thrust washer is produced from an unalloyed specialty steel with the designation C75S (corresponds to AISI/SAE 1074). This type of steel is suitable, in particular, for the provided purpose and features the chemical composition below:

0.70 to 0.80% C
0.15 to 0.35% Si
0.60 to 0.90% Mn
max. 0.025% P
max. 0.025% S
max. 0.40% Cr
max. 0.10% Mo
max. 0.040% Ni According to another feature of the invention from claim 3, the thrust washer exhibits a thickness $\leq 1$ mm. This is particularly advantageous, because prior thrust washers made from steel featured a larger axial thickness. Reducing the thickness of the thrust washer achieves a weight reduction, even if a small one, lower material costs, and also a slight shortening of the installation space.

According to another feature of the invention from claim 4, the thrust washer is made from the tempered cold-rolled strip through stamping and is subjected to a subsequent vibrational grinding process. The vibrational grinding process is known to someone skilled in the art as a mechanical workpiece machining operation in a moving bulk mass of grinding bodies (chips), which is supported chemically by the addition of liquid (compound). In the present case, through the vibrational grinding, the functional effect of the thrust washer is improved, because an improved lubrication of the planetary gearbox is possible due to the resulting rounding of the edges.

According to another feature from claim 5, the thrust washer should be provided on its positioning bore hole with through holes spaced apart from each other uniformly in the peripheral direction. These through holes expand outwards in the radial direction. Through this shape of the through holes, on one hand it is guaranteed that the thrust washer is placed with the largest possible inner peripheral surface of the positioning bore hole on the planet gear pins and that, on the other hand, an improved lubricating effect is enabled due to the through holes enlarged on the outside.

Finally, according to claim 6, the thrust washer has an outer diameter, which lies below a root circle of teeth of the planet gear. This arrangement guarantees that an optimal lubrication is possible between the thrust washer and planet gear or between the thrust washer and the planet carrier.

BRIEF DESCRIPTION OF THE DRAWINGS

The invention is explained in more detail using the following embodiment.

Shown are.

DETAILED DESCRIPTION OF THE PREFERRED EMBODIMENTS

Figure 1:
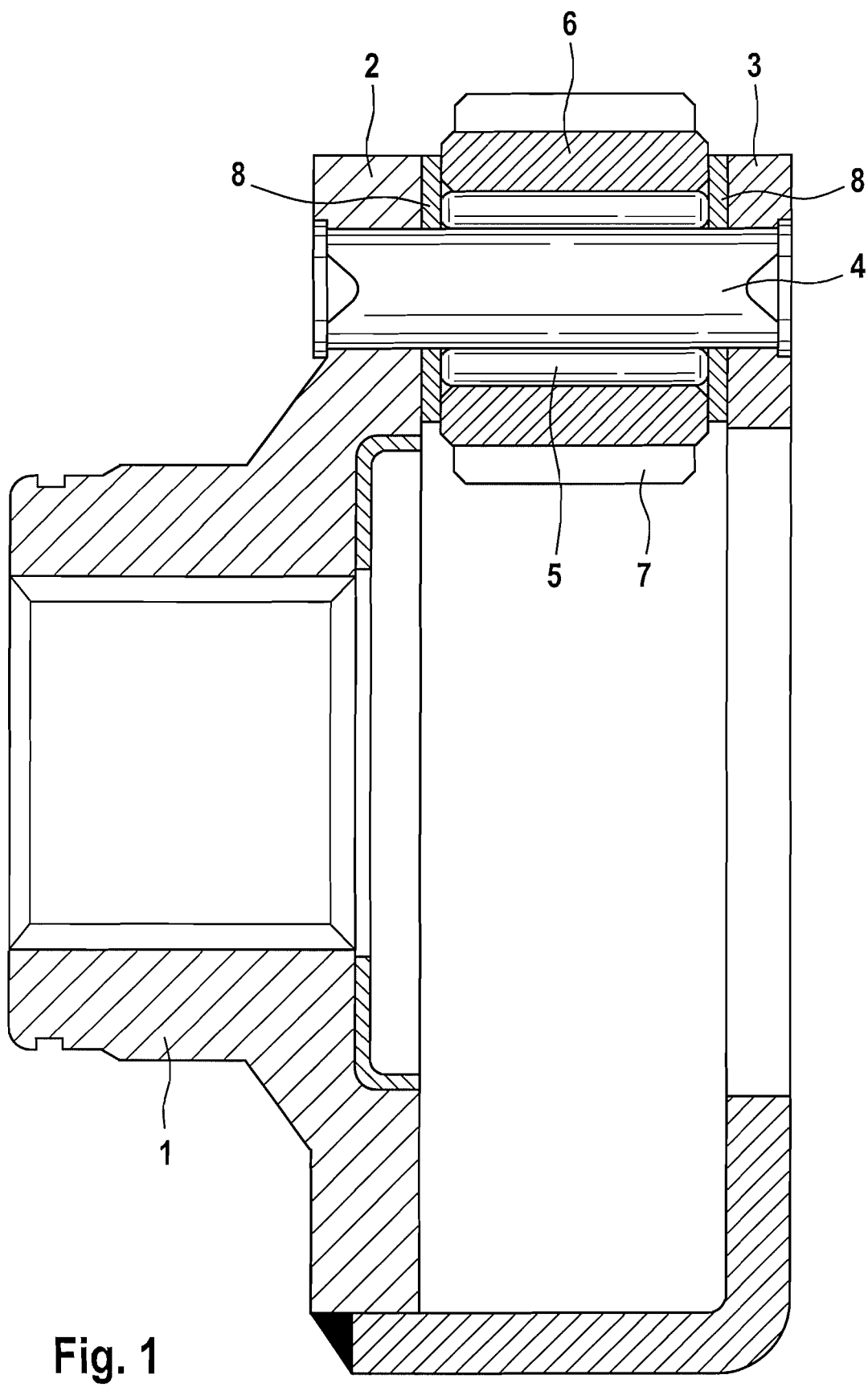
FIG. 1 a longitudinal section through a planet carrier according to the known state of the art, FIG. 2 a longitudinal section through a planet gear bearing according to the invention, FIG. 3 a plan view of a thrust washer according to the invention, and FIG. 4 a perspective view of a planet gear with thrust washer set according to the invention.

The planet carrier 1 shown in FIG. 1 according to the state of the art features two side walls 2, 3, in which planet gear pins 4 are fixed. On these pins, planet gears 6 are mounted rotatably via bearing arrangements 5. The teeth 7 of these planet gears mesh, on one side, with a not-shown ring gear and, on the other side, with a similarly not-shown sun gear. Thrust washers 8, which typically are formed of a material with good sliding properties, such as, e.g., sheet-metal plated with bronze, and which should thus prevent friction between the planet gears 6 and the planet carrier on one side and between the bearing 5 and the planet carrier 1 on the other side, are arranged on both sides of the planet gears 6 on the planet gear pins 4.

Figure 2:
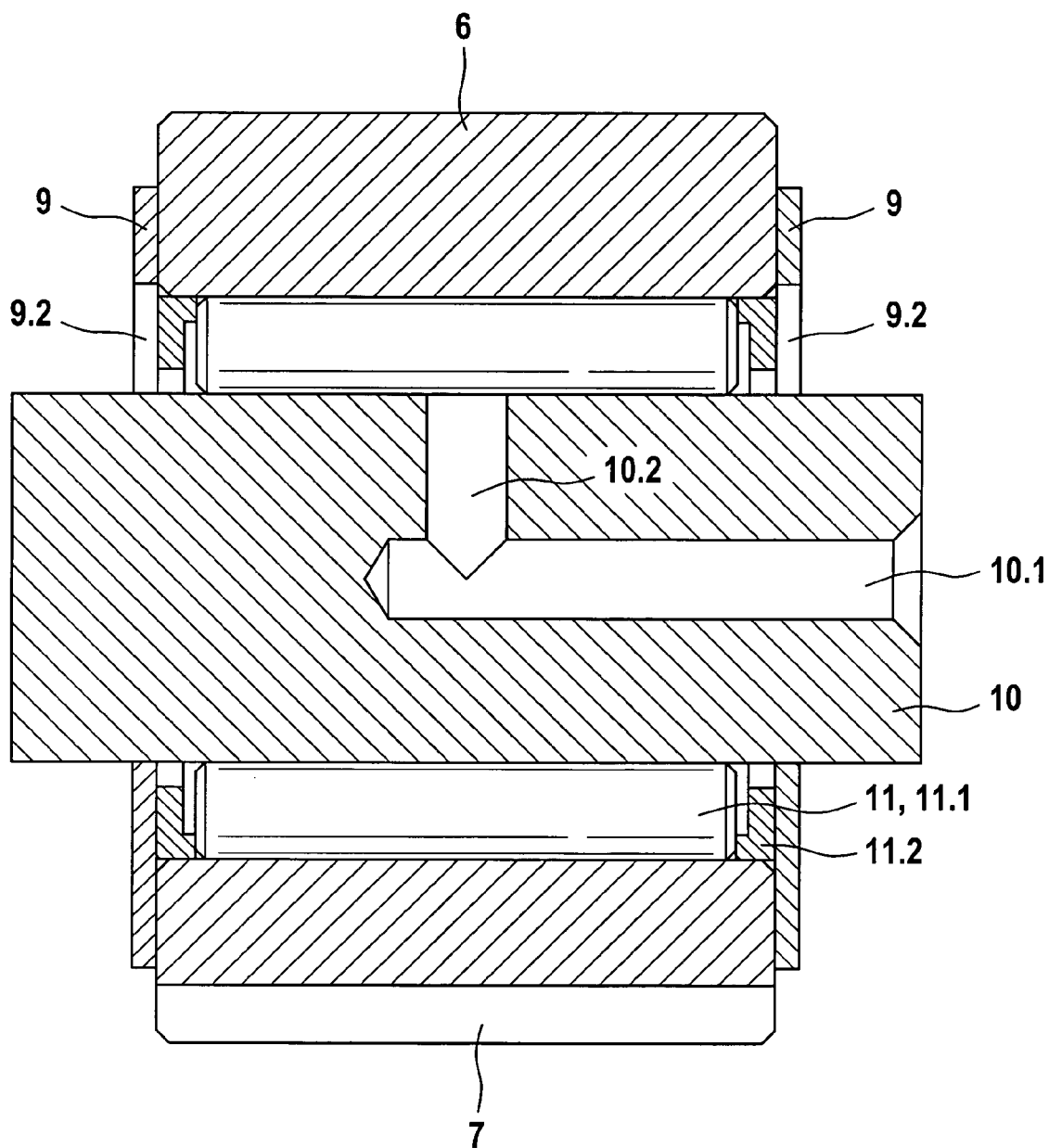
Figure 3:
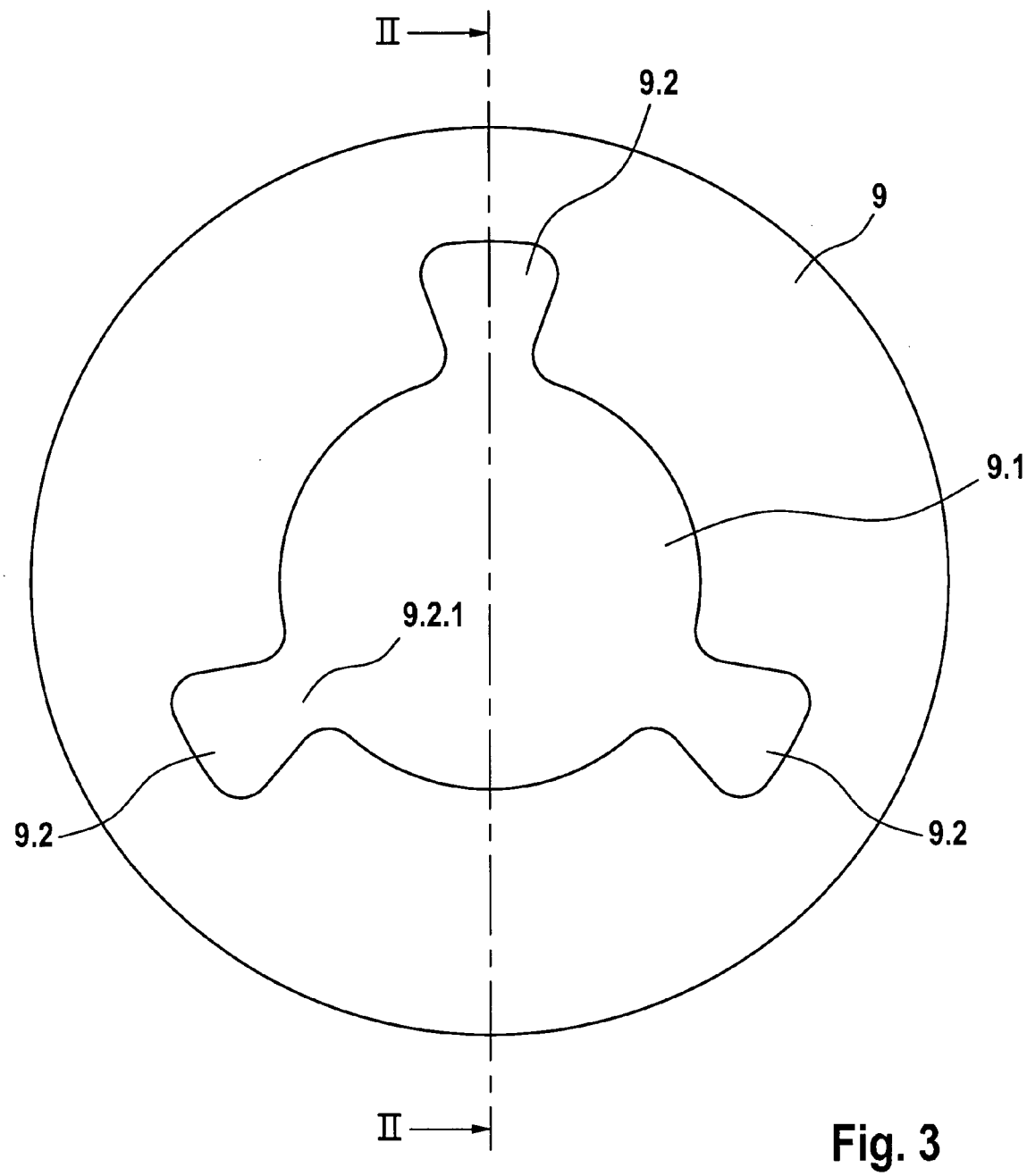
Figure 4:
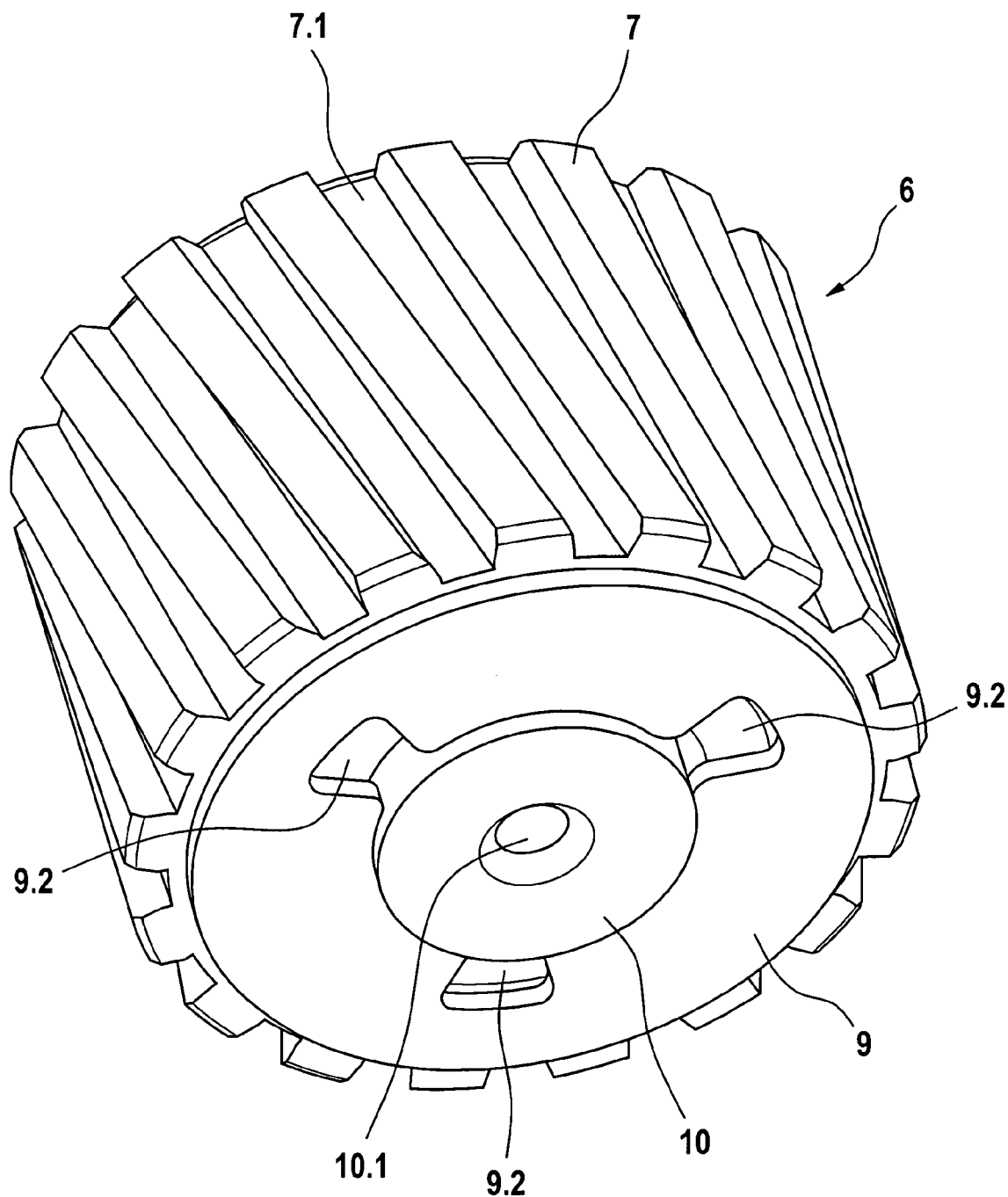

The thrust washer 9 according to the invention and shown in FIGS. 2, 3, and 4 is placed on the planet gear pin 10 on both sides of the planet gears 6 with its positioning bore hole 9.1. The pin 10 has an axial lubricant through hole 10.1 and a radial lubricant through hole 10.2 branching off from this axial hole. The planet gear pin 10 is, in turn, anchored in the side walls 2 and 3 of the planet gear carrier 1. The planet gears 6 are mounted rotatably on the planet gear pin 10 using a needle collar 11 comprising bearing needles 11.1 and cage 11.2.

As further shown in FIGS. 2, 3, and 4, the thrust washer 9 features inner through holes 9.2, which are connected to the positioning bore hole 9.1 via narrowed sections 9.2.1, at three peripheral points spaced apart from each other uniformly. As the figures show further, the inner axial through holes 9.2, viewed in the radial direction, are located in the region of the needle collar 11. Lubricant is first led via the axial lubricant through hole 10.1 and the radial lubricant through hole 10.2 of the planet gear pin 10 into the sliding raceway area of the bearing needles 11. From there, it is accelerated outwards by radial forces and first fills the inner axial through holes 9.2, which thus act as lubricant reservoirs. Then the lubricant is led outwards in the radial direction if there is a gap between the planet gear 6 and the thrust washer 9 or if there is a gap between the thrust washer 9 and the side wall 2, 3. In this way, a continuous flow of lubricant through the bearing arrangement can be guaranteed, so that the interacting friction partners are always separated from each other by a lubricant film.

As can also be seen in FIGS. 2 and 4, the thrust washer 9 features a radial edge, which lies slightly below a root circle 7.1 of the teeth 7 of the planet gear 6. In the sense of the invention, root circle 7.1 means the radial distance from the center point of the planet gear 6 to the lowest point of the teeth 7. In this way, on one hand a relatively large contact surface between the interacting friction partners is realized and on the other hand lubricant is preferably prevented from reaching the teeth 7.

Unalloyed specialty steel with the designation C75S [AISI/SAE 1074] is cold rolled into a strip with the thickness 0.5 mm. This cold-rolled strip is then tempered, that is, hardened and annealed until a hardness value of approximately 450 HV is set. The cold-rolled strip has a flatness of 0.03 mm. This is understood to mean that the tolerance surface of the cold-rolled strip must lie between two parallel planes with a spacing of only 0.03 mm. In other words, the cold-rolled strip features an excellent rolling quality and thus an excellent surface quality.

Now through material-saving nesting of the forms, which is possible simultaneously, a plurality of thrust washers 9 are stamped from this cold-rolled strip. These washers are exposed to a subsequent vibrational grinding process only for rounding the edges. The advantage of these thrust washers 9 according to the invention lies especially in the fact that their later, desired properties already exist in the preliminary material, that is, in the cold-rolled strip. In this way, an especially cost-effective production is possible.

REFERENCE SYMBOLS

1 Planet carrier
2 Side wall
3 Side wall
4 Planet gear pin
5 Bearing
6 Planet gear
7 Teeth
7.1 Root circle
8 Thrust washer
9 Thrust washer
9.1 Positioning bore hole
9.2 Axial through holes
9.2.1 Narrowed section
10 Planet gear pin 10.1 Axial lubricant through hole
10.2 Radial lubricant through hole
11 Needle collar
11.1 Bearing needle
11.2 Cage

The invention claimed is:

1. Thrust washer for planet gears of a planetary gearbox, with the thrust washer being adapted to be arranged with a positioning bore hole on planet gear pins fixed in a planet carrier so that thrust washers contact both sides of the planet gears, which are mounted rotatably on the planet gear pins via a rolling bearing, wherein for supplying lubricant the planet gear pin is provided with an axial lubricant through hole and a radial lubricant through hole branching off from this axial hole and the thrust washer is provided with axial through holes, the thrust washer is produced from a tempered, cold-rolled strip with a flatness of $\leq 0.03$ mm and exhibits a hardness of 370-580 HV, the thrust washer positioning bore hole is provided connected with the axial through holes which are uniformly spaced apart from each other in a peripheral direction and which expand circumferentially from narrowed sections as they extend outwardly in a radial direction.

2. Thrust washer according to claim 1, wherein the thrust washer is produced from an unalloyed specialty steel with the designation C75S.

3. Thrust washer according to claim 1, wherein the thrust washer has a thickness of $\leq 1$ mm.

4. Thrust washer according to claim 1, wherein the thrust washer is stamped from a tempered cold-rolled strip and subjected to a subsequent vibrational grinding process.

5. Thrust washer according to claim 1, wherein the thrust washer has an outer diameter that lies below a root circle of teeth of the planet gear.

* * * * *